(12) United States Patent
Schut

(10) Patent No.: US 10,737,725 B2
(45) Date of Patent: Aug. 11, 2020

(54) SYSTEM AND METHOD FOR ASSISTING PARALLEL PARKING USING ORTHOGONAL PROJECTION

(71) Applicant: Gentex Corporation, Zeeland, MI (US)

(72) Inventor: Jeremy A. Schut, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/134,106

(22) Filed: Sep. 18, 2018

(65) Prior Publication Data

US 2019/0092392 A1 Mar. 28, 2019

Related U.S. Application Data

(60) Provisional application No. 62/563,885, filed on Sep. 27, 2017.

(51) Int. Cl.
| | |
|---|---|
| *H04N 7/00* | (2011.01) |
| *B62D 15/02* | (2006.01) |
| *B60R 1/12* | (2006.01) |
| *B60R 1/00* | (2006.01) |

(52) U.S. Cl.
CPC ............ *B62D 15/0275* (2013.01); *B60R 1/00* (2013.01); *B60R 1/12* (2013.01); *B62D 15/029* (2013.01); *B60R 2001/1253* (2013.01); *B60R 2300/806* (2013.01); *B60R 2300/8086* (2013.01)

(58) Field of Classification Search
CPC .... B62D 15/0275; B62D 15/029; B60R 1/12; B60R 1/00; B60R 2001/1253; B60R 2300/806; B60R 2300/8086
USPC ................. 348/119, 120, 121, 116, 113, 135
See application file for complete search history.

(56) References Cited

U.S. PATENT DOCUMENTS

| | | | |
|---|---|---|---|
| 8,289,189 B2 * | 10/2012 | Becker | ...................... B60R 1/00 340/932.2 |
| 9,007,462 B2 | 4/2015 | Mitsugi | |
| 9,506,774 B2 | 11/2016 | Shutko et al. | |
| 2011/0140921 A1 * | 6/2011 | Pampus | ............. G06K 9/00812 340/932.2 |

FOREIGN PATENT DOCUMENTS

EP 2726315 B1 5/2014

* cited by examiner

*Primary Examiner* — Robert Chevalier
(74) *Attorney, Agent, or Firm* — Price Heneveld LLP; Bradley D. Johnson

(57) ABSTRACT

A system is provided for assisting a driver of a vehicle with parallel parking of the vehicle. The system includes at least one imager positioned to capture images of a scene to at least a side of the vehicle and to output image data, and an image processor for processing the image data received from the at least one imager to create an orthographic projection from the image data, where the orthographic projection shows side views of parking spaces and a graphic representation of the vehicle to be parked shown in relative locations to the parking spaces to enable the driver to determine the relative size of the parking spaces.

20 Claims, 5 Drawing Sheets

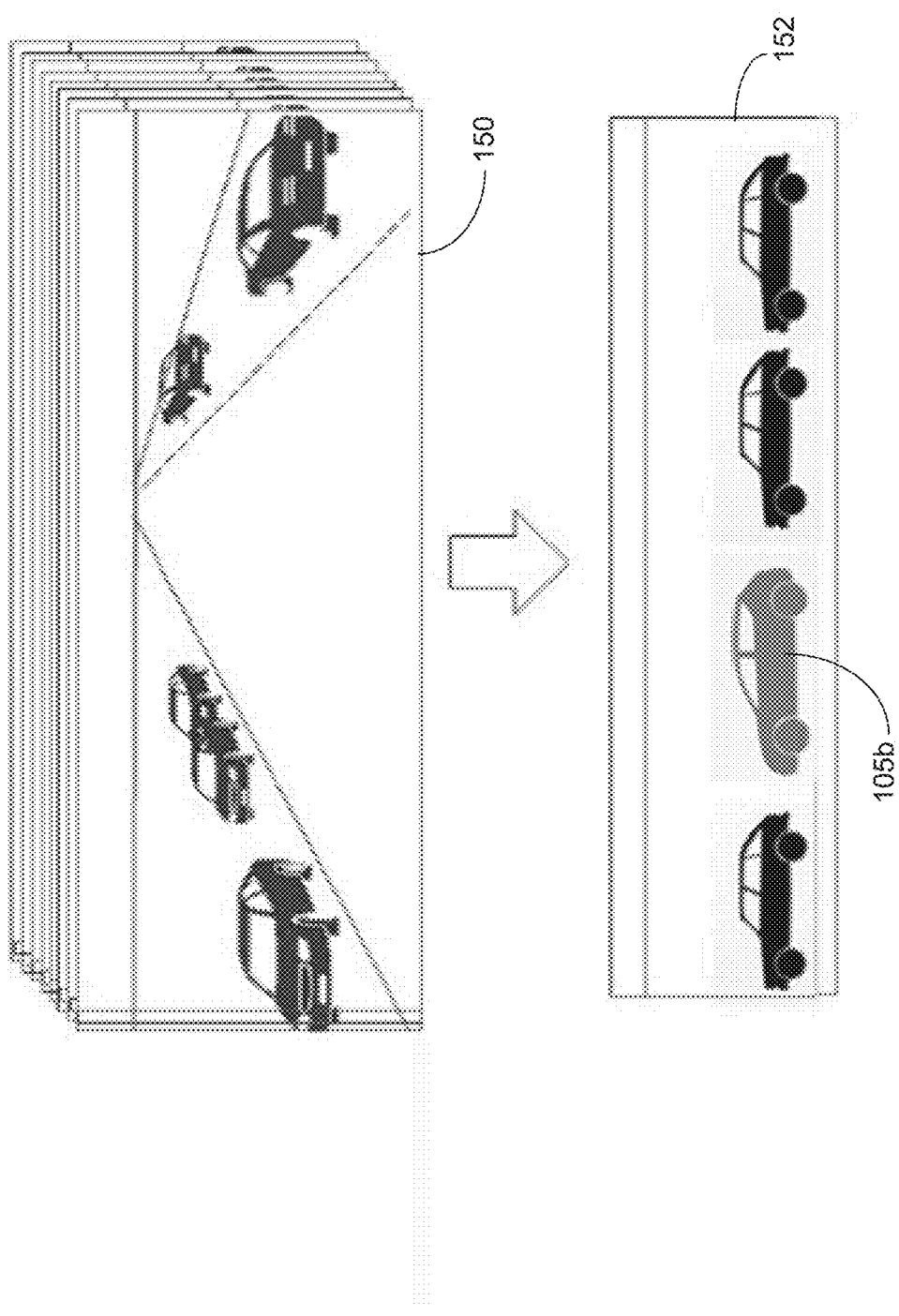

SYSTEM AND METHOD FOR ASSISTING PARALLEL PARKING USING ORTHOGONAL PROJECTION

CROSS-REFERENCE TO RELATED APPLICATION

This application claims priority to and the benefit under 35 U.S.C. § 119(e) of U.S. Provisional Patent Application No. 62/563,885, filed on Sep. 27, 2017, entitled "SYSTEM AND METHOD FOR ASSISTING PARALLEL PARKING USING ORTHOGONAL PROJECTION," by Jeremy A. Schut, the entire disclosure of which is incorporated herein by reference.

TECHNOLOGICAL FIELD

The present invention generally relates to systems for assisting the driver of a vehicle with parallel parking for vehicles and more particularly to systems for assisting a driver with parallel parking by determining whether the vehicle will fit within a parking spot.

SUMMARY OF THE DISCLOSURE

According to one aspect of the present disclosure, a system is provided for assisting a driver of a vehicle with parallel parking of the vehicle. The system includes at least one imager positioned to capture images of a scene to at least a side of the vehicle and to output image data, and an image processor for processing the image data received from the at least one imager to create an orthographic projection from the image data, where the orthographic projection includes side view information of parking spaces that is used to provide information to the driver regarding the relative size of the parking spaces.

According to another aspect of the present disclosure, a system is provided for assisting a driver of a vehicle with parallel parking of the vehicle. The system comprises: at least one imager positioned to capture images of a scene to at least a side of the vehicle and to output image data; an image processor for processing the image data received from the at least one imager to create an orthographic projection from the image data, where the orthographic projection includes side view information of parking spaces that is used to provide information to the driver regarding the relative size of the parking spaces; and a display for receiving and displaying the orthographic projection, wherein the orthographic projection shows side views of parking spaces and a graphic representation of the vehicle to be parked shown in relative locations to the parking spaces to enable the driver to determine the relative size of the parking spaces.

According to another aspect of the present disclosure, an imaging system is provided for a vehicle, the imaging system comprises at least one imager positioned to capture images of a scene to at least a side of the vehicle and to output image data; and an image processor for processing the image data received from the at least one imager to create an orthographic projection from the image data, where the orthographic projection includes side views of any objects to the side of the vehicle.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 5 is an alternative set of images including captured images and a resulting orthographic projection.

DETAILED DESCRIPTION

Figure 1:
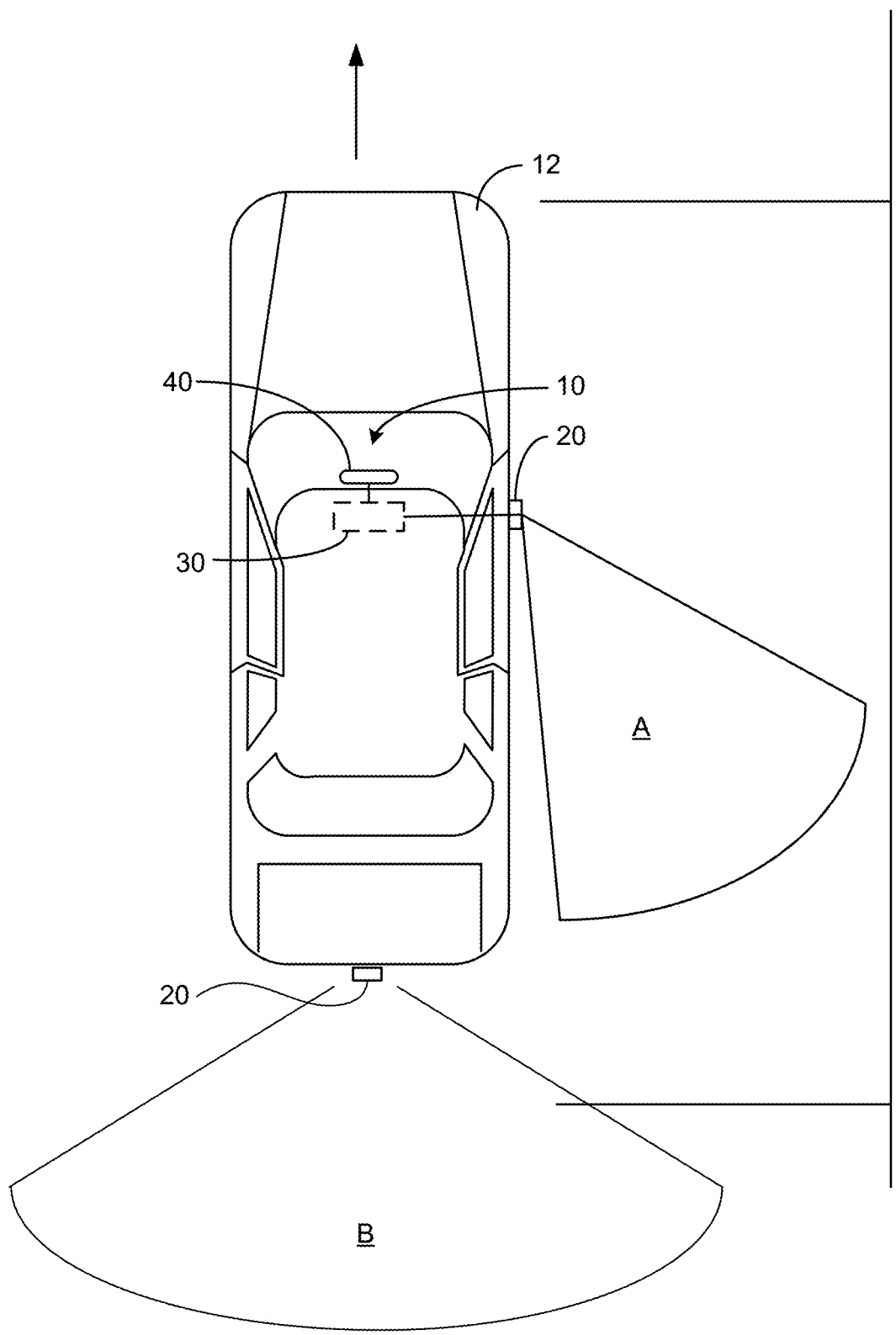
FIG. 1 is a top view of a host vehicle in which a parking assist system is implemented.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of a display, and the term "rear" shall refer to the surface of the element further from the intended viewer of the display. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises a . . . " does not, without more constraints, preclude the existence of additional identical elements in the process, method, article, or apparatus that comprises the element.

Systems are known for providing a driver of a vehicle with assistance in parking the vehicle. Some of these systems require multiple cameras capturing images all around the vehicle to provide an overhead bird's eye view of the vehicle and its surroundings. The overhead perspective shows flat ground accurately; however, objects not on the ground plane can appear extremely warped and distorted. Such distortion makes it difficult to gauge if a nearby parking space is large enough to fit into. For example, part of the empty parking space may become obscured by the distorted display of another vehicle. Other systems use ultrasonic sensors to determine the size of an open parking space and then either guide or automate the parallel parking process. However, such systems are more expensive to implement due to the additional hardware (sensors) required. Further, there are times the driver may not need help for the parallel parking process, but would like to be sure that the space in which they are trying to park is large enough to fit their vehicle into.

Figure 2:
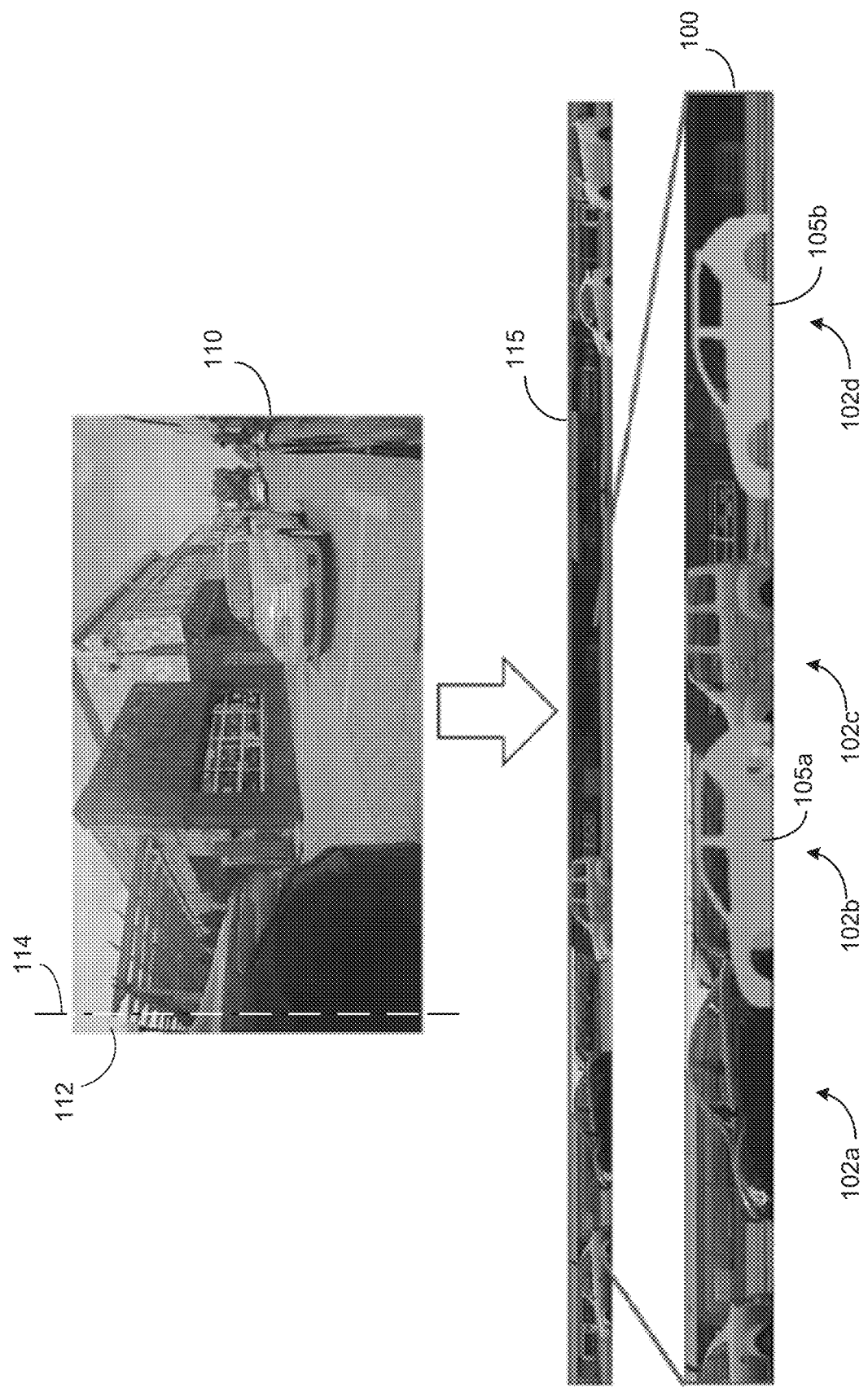
FIG. 2 shows an exemplary captured image, an intermediate orthographic projection buffer, and a final orthographic projection as used and generated using the parking assist system.

Referring to FIG. 1, a top view of a vehicle 12 is shown in which a parking assist system 10 is implemented. The system 10 is provided for assisting a driver of the vehicle 12 with parallel parking of the vehicle. The parking assist system 10 may include at least one imager 20 positioned to capture a scene to at least a side of the vehicle 12 (and or rear/front of the vehicle) and to output image data, an image processor 30 for processing the image data received from the at least one imager 20 to create an orthographic projection from the image data. As shown in FIG. 2 and described further below, the orthographic projection 100 shows side views of cars parked along the side of the road and potential parking spaces 102a-102d and a graphic representation (105a, 105b) of the vehicle to be parked shown in relative locations to the parking spaces to enable the driver to determine the relative size of the parking spaces and hence whether the vehicle 12 will fit in any of the available parking spaces. The parking assist system 10 may optionally include a display 40 for receiving and displaying the orthographic projection 100.

Figure 3:
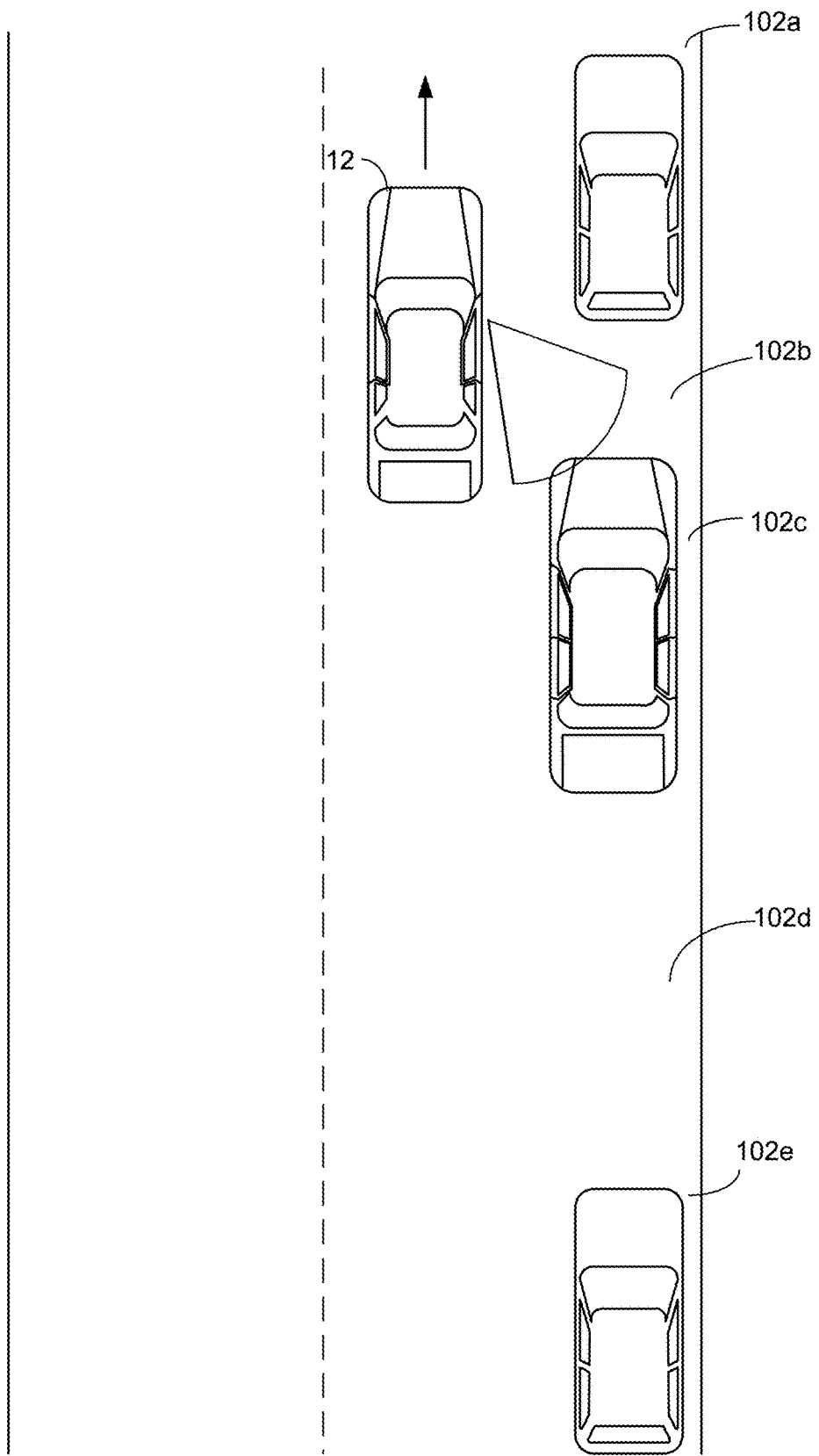
FIG. 3 is a top view of the host vehicle shown on a street with parking spaces and other vehicles.

The imager 20 may be mounted and configured to have any field of view A to the side of the vehicle 12 (typically at the passenger side) or a field of view B to the rear or front of the vehicle 12 as described further below. An example of a full single frame image 110 as captured by the imager 20 is shown in FIG. 2. As illustrated in FIG. 3, as the vehicle 12 is driven forward past parking spaces 102a-102e, the imager 20 captures a series of such images 110. To create the orthographic projection 100, the image processor 30 stores a vertical slice 112 corresponding to the forwardmost portion of image 110 to the left of dashed line 114. This vertical slice 112 may correspond to a specific number of leftmost columns of pixels of imager 20. The particular number of columns of pixels used for vertical slice 112 may correspond to the vehicle speed and rate of image capture. Further, the particular pixel columns used may be those that are closest to capturing a view orthogonal to the vehicle's direction of travel. Thus, if the field of view A of the imager 20 is aimed directly sideways from the vehicle 12, the pixel columns used may be the middle columns of the imager. By using the pixel columns closest to capturing a view orthogonal to the vehicle's direction of travel, the skew present in the orthogonal projection may be minimized. Additional image processing for de-warping may also be performed. Such image processing could be performed if using an imager 20 with a wider field of view like that used for a reverse camera display (RCD), perhaps even an imager with a fisheye lens.

As the vehicle travels, the image processor 30 stores a vertical slice 112 from each image captured and stitches these vertical slices 112 one after another to create an intermediate orthogonal projection buffer 115. The image processor 30 may then overlay a graphic image(s) 105a, 105b of the vehicle over possible parking spaces (102b, 102d) and cause a portion of the intermediate orthogonal projection buffer 115 with the overlaid graphic image(s) 105a, 105b of the vehicle to be displayed on display 40 as the orthogonal projection 100. In the case where a possible parking space 102b is too small, the overlaid graphic image 105b of the vehicle may be a first color (such as red) to indicate to the driver that the space is too small. In the case where a possible parking space 102d is large enough, the overlaid graphic image 105a of the vehicle may be a second color (such as green) to indicate to the driver that the space is large enough.

The image processor 30 may overlay only a single graphic image (105a or 105b) of the vehicle at a time that appears to move alongside the parking spaces 102a-102e and have the graphic image change color to indicate whether the particular adjacent parking space is too small or large enough. On the other hand, the image processor 30 may overlay a graphic image (105a, 105b) over each possible parking space shown in the orthogonal projection 100 so that the driver may at once see which of the possible parking spaces is large enough.

The graphic image(s) 105a, 105b of the host vehicle may be generated so that they have an appropriate length relative to the parking space sizes and other objects in the orthographic projection.

Figure 4:
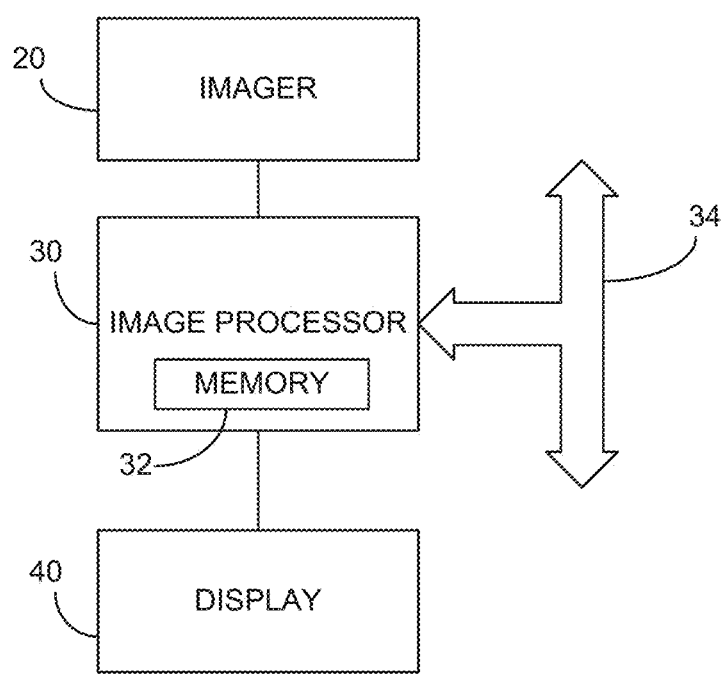
FIG. 4 is an electrical circuit diagram in block form of the parking assist system.

FIG. 4 shows a block diagram of an electrical circuit for implementing parking assist system 10. As shown, the image processor 30 may include memory 32 (e.g., random access memory, read only memory, flash memory, hard disk storage, flash memory storage, solid state drive memory, etc.). The memory 32 may be used to facilitate the functions of the system 10 as described herein such as storing image data and orthographic projections. Memory 32 may include computer code modules, data, computer instructions, or other information which may be executed by the image processor 30 or otherwise facilitate the functions of the system 10 described herein. The memory 32 and/or the image processor 30 may facilitate the functions described herein using one or more programming techniques, data manipulation techniques, and/or processing techniques such as using algorithms, routines, lookup tables, arrays, searching, databases, comparisons, instructions, etc.

The image processor 30 may be in communication with a vehicle communication bus 34 of the vehicle 12. The communication bus 34 may be configured to deliver signals to the image processor 30 identifying various states of the vehicle 12. For example, the communication bus 34 may be configured to communicate an operating condition data or telemetry data of the vehicle (e.g., vehicle speed, parking assistance has been requested, a gear selection, or setting, etc.).

The image processor 30 may include various types of image processing circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the image processor 30 may be a system on a chip (SoC) individually or with additional hardware components described herein.

The display 40 may be disposed in a rearview assembly of the vehicle 12 or provided elsewhere such as in an overhead console or an instrument panel. The orthographic projection 100 may be displayed across the entirety of the display 40 or along a top or bottom area of the display 40, which may display other images or data.

Although a display 40 is described along with visually displaying the orthographic projection 100, it is possible that the system 10 may not include any display of the orthographic projection 100, but instead the system may use the image data of the orthographic projection 100 to determine if the vehicle 12 will fit into an adjacent parking space and provide an audible and/or visual indication that a parking space into which the driver is attempting to park the vehicle is too small.

The imager 20 may be disposed in a side rearview mirror assembly or otherwise provided on the side of a vehicle. It is possible to mount imager 20 on the rear or front of the vehicle 12 as well. FIG. 5 shows an example of where images 150 are captured using a rearward facing imager having a field of view B and an orthographic projection 152 is created from those images 150. In this way, a rearward facing imager that is otherwise used for other functions, such as capturing images for reverse camera display (RCD) or full display mirrors (FDMs), can be used for this additional function. Moreover, if a side facing imager 20 is used, the imager 20 may also serve additional functions such as creating a portion of an image for an FDM or for blind spot displays. It may also be useful to use more than one imager as parking spaces may be on both the driver's side and the passenger's side when on a one-way street.

The parking assist system 10 described above solves the problem of image distortion of other parked cars by providing a different perspective. A perspective in which the size of the open parking space in relation to the host vehicle is easily determined and the driver can quickly tell if the parking space is large enough. The system 10 also does not require the vehicle to have ultrasonic sensors to determine the parking space size.

Although the above description refers to assisting the driver with parallel parking, the orthographic projection may be used for other purposes. For example, it may be used to generate a warning to the passenger when opening their door to prevent them from hitting a tree or other close object next to the door.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A system for assisting a driver of a vehicle with parallel parking of the vehicle, the system comprising:
    at least one imager positioned to capture images of a scene to at least a side of the vehicle and to output image data; and
    an image processor for processing the image data received from the at least one imager to create an orthographic projection from the image data, where the orthographic projection includes side view information of parking spaces that is used to provide information to the driver regarding the relative size of the parking spaces.

2. The system of claim 1, wherein the orthographic projection shows side views of parking spaces and a graphic representation of the vehicle to be parked shown in relative locations to the parking spaces to enable the driver to determine the relative size of the parking spaces.

3. The system of claim 1, wherein the representation of the vehicle to be parked is generated to have a representative length relative to sizes of the parking spaces and other objects in the orthographic projection.

4. The system of claim 1 and further comprising a display for receiving and displaying the orthographic projection.

5. The system of claim 4, wherein the image processor analyzes the orthographic projection to determine the size of each available parking space and to determine if the vehicle to be parked will fit into each available parking space, wherein an indication of whether the vehicle will fit into the closest of the available parking spaces is displayed on the display.

6. The system of claim 5, wherein the orthographic projection shows side views of parking spaces and a graphic representation of the vehicle to be parked shown in relative locations to the parking spaces to enable the driver to determine the relative size of the parking spaces.

7. The system of claim 6, wherein the indication of whether the vehicle will fit into the closest of the available parking spaces includes changing the color of the graphic representation of the vehicle.

8. The system of claim 6, wherein the graphic representation of the vehicle moves in the orthographic projection to simulate the position of the vehicle to be parked relative to the parking spaces.

9. The system of claim 1, wherein, as the vehicle to be parked travels, the image processor stores a vertical slice from each image captured and stitches stored vertical slices one after another to create an intermediate orthogonal projection buffer, and wherein the image processor creates the orthographic projection from a portion of the intermediate orthogonal projection buffer.

10. The system of claim 1, wherein the scene captured by the imager is to the side and a rear of the vehicle.

11. The system of claim 1, wherein the imager is mounted to one of a side and a rear of the vehicle.

12. A system for assisting a driver of a vehicle with parallel parking of the vehicle, the system comprising:
    at least one imager positioned to capture images of a scene to at least a side of the vehicle and to output image data;
    an image processor for processing the image data received from the at least one imager to create an orthographic projection from the image data, where the orthographic projection includes side view information of parking spaces that is used to provide information to the driver regarding the relative size of the parking spaces; and a display for receiving and displaying the orthographic projection, wherein the orthographic projection shows side views of parking spaces and a graphic representation of the vehicle to be parked shown in relative locations to the parking spaces to enable the driver to determine the relative size of the parking spaces.

13. The system of claim 12, wherein the representation of the vehicle to be parked is generated to have a representative length relative to sizes of the parking spaces and other objects in the orthographic projection.

14. The system of claim 12, wherein the image processor analyzes the orthographic projection to determine the size of each available parking space and to determine if the vehicle to be parked will fit into each available parking space, and wherein the image processor changes the color of the graphic representation of the vehicle to indicate whether the vehicle will fit into the closest of the available parking spaces.

15. The system of claim 12, wherein the graphic representation of the vehicle moves in the orthographic projection to simulate the position of the vehicle to be parked relative to the parking spaces.

16. The system of claim 12, wherein, as the vehicle to be parked travels, the image processor stores a vertical slice from each image captured and stitches stored vertical slices one after another to create an intermediate orthogonal projection buffer, and wherein the image processor creates the orthographic projection from a portion of the intermediate orthogonal projection buffer.

17. The system of claim 12, wherein the scene captured by the imager is to the side and a rear of the vehicle.

18. The system of claim 12, wherein the imager is mounted to one of a side and a rear of the vehicle.

19. An imaging system for a vehicle, the imaging system comprising:

at least one imager positioned to capture images of a scene to at least a side of the vehicle and to output image data; and an image processor for processing the image data received from the at least one imager to create an orthographic projection from the image data, where the orthographic projection includes side views of any objects to the side of the vehicle.

20. The system of claim 19, wherein, as the vehicle travels, the image processor stores a vertical slice from each image captured and stitches stored vertical slices one after another to create an intermediate orthogonal projection buffer, and wherein the image processor creates the orthographic projection from a portion of the intermediate orthogonal projection buffer.

* * * * *